Figure 1:
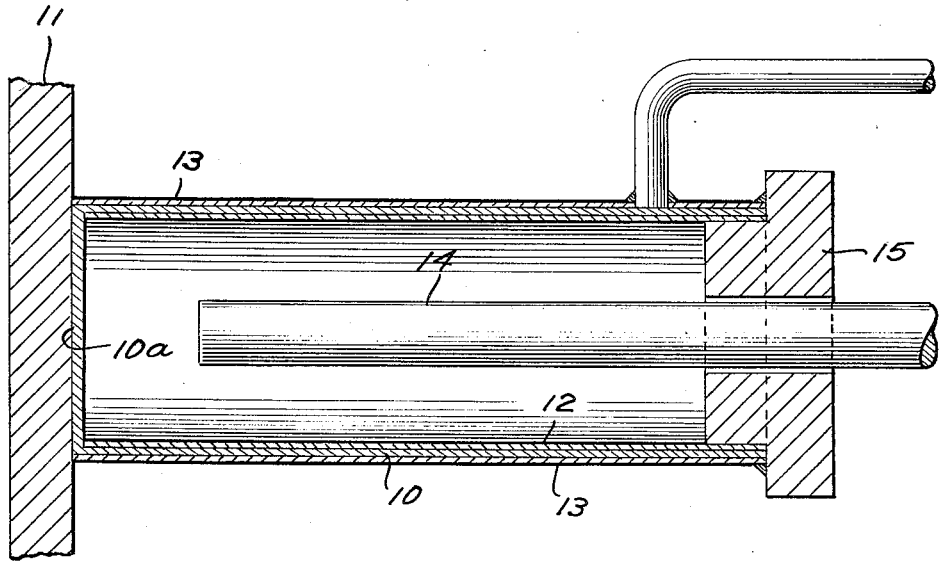

July 20, 1965  W. R. OPPEN ETAL  3,196,295
THERMIONIC TEMPERATURE SENSOR
Filed Jan. 18, 1962

INVENTORS
WALTER OPPEN
MICHAEL SILVERBERG
MYLES SPATNY
BY Borst & Borst
ATTORNEYS

United States Patent Office 3,196,295
Patented July 20, 1965

3,196,295
THERMIONIC TEMPERATURE SENSOR
Walter R. Oppen, Plandome, and Michael Silverberg, Little Neck, N.Y., and Myles Spatny, Loveland, Ohio, assignors to Sperry Rand Corporation, Long Island City, N.Y., a corporation of Delaware
Filed Jan. 18, 1962, Ser. No. 167,055
1 Claim. (Cl. 310—4)

This invention relates to electrical transducers and particularly to transducers capable of measuring temperature.

The transducer which is the subject of the invention is a thermionic temperature sensitive device which is adapted to provide a virtual linear output over a wide range of temperature. The sensor may be disposed in a simple electrical circuit, the external section of which may be exclusively resistive. When the sensor is placed in close proximity to a heat source, the current through the external circuit will be a function of the temperature of the high temperature component to the device and is independent of other physical phenomenon relating to this component. Hence, the current being independent of the cathode work function is, therefore, independent of variations in cesium pressure and surface charges on the cathode. In the instant case, the high temperature component is the cathode of a two-element sensor, the anode of which will have a constant work function due to the presence of cesium gas which is confined in the space between the cathode and the anode. The continual arrival and evaporation of the cesium atoms at the surface of the anode imparts to this component a self-healing quality which gives rise to the anode's constant work function. Accordingly, while the current in the external circuit is dependent on the work function of the anode, this factor is maintained substantially constant and therefore, the current will vary solely as a function of the cathode temperature. The sole condition for the linear dependence of the current in the circuit on the temperature of the cathode element in the sensor is that the sensor be operated at less than saturated emission. Appropriate choice of load resistance then results in an output which is nearly linear in temperature over the entire operating range of the sensor.

One object of the invention is to provide a thermionic temperature sensor, the output of which is nearly linear with temperature over a wide temperature range.

Another object of the invention is to provide a temperature sensor which does not require a power supply.

Another object of the invention is to provide an improved thermionic temperature sensor which is adapted to be placed in an external circuit and whose sensitivity to temperature change can be made dependent on the resistance in the external circuit.

Another object of the invention is to provide a thermionic temperature sensor which has a relatively low heat capacity and a fast response time.

Figure 2:
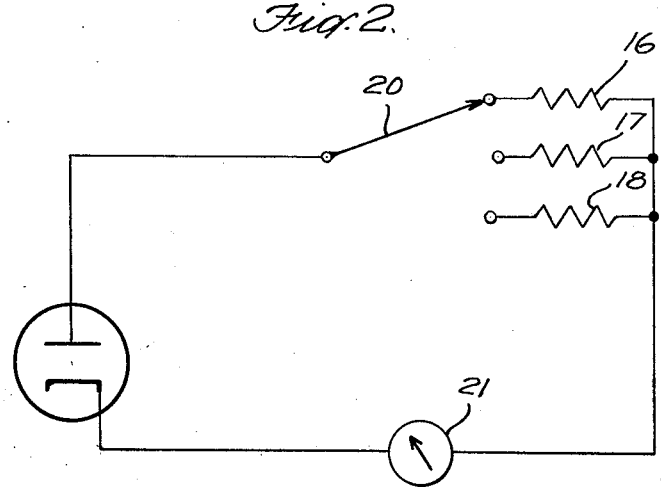

Other objects and advantages of the invention will be appreciated on reading the following detailed description of one of its embodiments which is taken in conjunction with the drawings, in which FIG. 1 is an elevation in section showing the details of the thermionic temperature sensor, and FIG. 2 illustrates schematically a simple circuit in which the sensor is disposed and which has a variable resistance means in the external circuit.

As shown in FIG. 1, the sensor is provided with a cylindrical cathode component 10 which is fabricated of molybdenum. The cylindrical cathode is closed at one end and the flat end section 10A which serves to close this end of the cathode is mounted against the surface of the material 11 the temperature of which the sensor and its external circuit is designed to test. The internal surface 12 of the cathode 10 is covered with an insulating coating of aluminum oxide with the exception of the flat end section 10A. The outer surface 13 of the cylindrical cathode is coated with silicon with the exception of the end section 10A to minimize oxidation in the high temperature ranges.

A molybdenum anode 14 is disposed within the cathode concentrically thereof, there being an aluminum oxide insulator 15 to seal the end of the cathode element opposite to the end section 10A for the purpose of insulating the internal anode.

The interelectrode space is evacuated and is filled with cesium vapor. The cathode then serves as a source of electrons and ions. Upon heating the cathode a plasma of electrons and cesium ions is formed and a current flows from cathode to anode through the external circuit. As shown in FIG. 2, this circuit comprises a plurality of resistors 16, 17 and 18 each having a different resistance from the others and adapted to be connected into the external circuit by the switch 20. The linear rate of change of the current in the circuit in accordance with the temperature of the cathode element in the sensor will depend upon the resistance which is selected for the particular temperature range in which the device will be expected to be operated. The sensor in converting the heat supplied to the cathode by the test material 11 into electrical energy operates an external meter 21 in the circuit which is calibrated to read out the current being generated.

In operation, heating the cathode causes the flow of electrons to the anode which has a complete or almost complete monolayer covering of cesium. This is accomplished by keeping the anode temperature below 1,000 to 1,000° K. depending on the cesium pressure. The anode takes the form of a solid rod for good heat conduction which may be finned if necessary. The cathode being molybdenum may be heated to about 2500° K. and the protective outer coating on the cylindrical cathode will prevent its oxidation up to that temperature. Aside from silicon, the coating may be chromium and it has been found that tungsten may be substituted for molybdenum as the base material of the electrodes to permit higher temperature operation although it must be recognized that less is known today about protective coatings for tungsten than for example, molybdenum. The transient response of the device will be determined by the rate of heat absorption by the cathode and its thermal capacity by the rate of heat supplied. The thermal capacity of the cathode should be about 250° C. per second which means that should the heat source be removed the cathode would cool at this rate. In operation, there will be about 24 watts of heat loss at 2000° K. Heat will be lost by conduction along the outer cylindrical surface of the cathode, radiation of the cathode to the anode and because of the electron cooling of the cathode. As previously mentioned, the conditions for the desired linear output independent of cathode work function and of anode work function are that the sensor be operated at less than saturation flow from the cathode to the anode and the presence of cesium gas which will cover the anode as a monolayer.

Various modifications of the sensor as described above may be effected by persons skilled in the art without departing from the principle and scope of the invention as defined in the appended claim.

What is claimed is:

A thermionic sensor comprising an outer envelope formed as a cylinder and having high electron emission characteristics, a substantial portion of the inner surface of said envelope being coated with insulator material, the uncoated portion of said outer envelope constituting a cathode electrode, the outer surface of said substantial portion in said outer envelope being coated with a material preventing oxidation, an anode electrode mounted in the interior of the sensor and insulated from said envelope and an ionizable gas disposed in the interelectrode space within the sensor.

References Cited by the Examiner

UNITED STATES PATENTS

| | | | |
|---|---|---|---|
| 1,860,187 | 5/32 | Koller | 313—310 |
| 2,263,169 | 11/41 | Evans | 313—310 |
| 2,290,913 | 7/42 | Lopp et al. | 313—310 |
| 2,586,291 | 2/52 | Bender | 313—310 |
| 2,875,367 | 2/59 | Beggs | 313—340 |

FOREIGN PATENTS 738,077  10/55  Great Britain.

MILTON O. HIRSHFIELD, *Primary Examiner.*
JAMES D. KALLAM, *Examiner.*